United States Patent
Zhou

(10) Patent No.: US 11,188,627 B2
(45) Date of Patent: Nov. 30, 2021

(54) METHOD FOR FINGERPRINT UNLOCKING AND TERMINAL

(71) Applicant: Guangdong Oppo Mobile Telecommunications Corp., Ltd., Guangdong (CN)

(72) Inventor: Yibao Zhou, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 624 days.

(21) Appl. No.: 16/119,111

(22) Filed: Aug. 31, 2018

(65) Prior Publication Data
US 2019/0018945 A1 Jan. 17, 2019

Related U.S. Application Data

(63) Continuation of application No. PCT/CN2017/079612, filed on Apr. 6, 2017.

(30) Foreign Application Priority Data

Apr. 8, 2016 (CN) .......................... 201610218370.1

(51) Int. Cl.
*G06F 21/32* (2013.01)
*G07C 9/37* (2020.01)
(Continued)

(52) U.S. Cl.
CPC ............. *G06F 21/32* (2013.01); *G06K 9/001* (2013.01); *G06K 9/0002* (2013.01);
(Continued)

(58) Field of Classification Search
CPC .. G06F 21/32; G07C 9/37; G07C 9/00; G07C 9/00563; G06K 9/0002; G06K 9/00087; G06K 9/001; G06K 9/036; G06K 9/00
(Continued)

(56) References Cited

U.S. PATENT DOCUMENTS 5,883,971 A 3/1999 Bolle et al.
6,330,345 B1 * 12/2001 Russo .................. G06K 9/0002
348/218.1
(Continued)

FOREIGN PATENT DOCUMENTS

CN 101593268 A 12/2009
CN 103745147 A 4/2014
(Continued)

OTHER PUBLICATIONS

Qi et al., A Hybrid Method for Fingerprint Image Quality Calculation, Oct. 18, 2005, IEEE (Year: 2005).*
(Continued)

*Primary Examiner* — Farid Homayounmehr
*Assistant Examiner* — Thanh T Le
(74) *Attorney, Agent, or Firm* — Young Basile Hanlon & MacFarlane, P.C.

(57) ABSTRACT

A method for fingerprint unlocking is provided. Multiple fingerprint images are obtained, by acquiring fingerprints through adjusting adjustment parameters of a fingerprint acquisition chip of a fingerprint recognition module, in response to detecting that the fingerprint recognition module is pressed. A target fingerprint image with the best image quality is determined from the multiple of fingerprint images. A terminal is unlocked when the target fingerprint image matches a preset fingerprint image successfully. A terminal is also provided.

17 Claims, 4 Drawing Sheets

(51) Int. Cl.
  *G07C 9/00* (2020.01)
  *G06K 9/00* (2006.01)
  *G06K 9/03* (2006.01)
  *H04N 5/357* (2011.01)

(52) U.S. Cl.
  CPC ......... *G06K 9/00087* (2013.01); *G06K 9/036* (2013.01); *G07C 9/00* (2013.01); *G07C 9/00563* (2013.01); *G07C 9/37* (2020.01); *H04N 5/357* (2013.01)

(58) Field of Classification Search
  USPC .......................................................... 729/19
  See application file for complete search history.

(56) References Cited

U.S. PATENT DOCUMENTS

| | | | | |
|---|---|---|---|---|
| 9,195,879 | B1* | 11/2015 | Du | G06K 9/00067 |
| 2002/0146156 | A1 | 10/2002 | Morimura et al. | |
| 2005/0174128 | A1 | 8/2005 | Kim et al. | |
| 2012/0062720 | A1* | 3/2012 | Choi | H04N 5/23245 |
| | | | | 348/78 |
| 2013/0083246 | A1 | 4/2013 | Chen et al. | |
| 2013/0100267 | A1* | 4/2013 | Baek | G06K 9/4638 |
| | | | | 348/77 |
| 2013/0321677 | A1 | 12/2013 | Cote et al. | |
| 2015/0023571 | A1 | 1/2015 | Gozzini et al. | |
| 2016/0078268 | A1 | 3/2016 | Mankowski et al. | |
| 2016/0078274 | A1* | 3/2016 | Tuneld | G06K 9/00885 |
| | | | | 382/124 |
| 2016/0227144 | A1 | 8/2016 | Gendai | |
| 2017/0032165 | A1 | 2/2017 | Hansen et al. | |
| 2017/0286452 | A1* | 10/2017 | Gupta | G06F 16/583 |
| 2017/0330018 | A1* | 11/2017 | Li | G06K 9/036 |

FOREIGN PATENT DOCUMENTS

| | | |
|---|---|---|
| CN | 104464008 A | 3/2015 |
| CN | 105022984 A | 11/2015 |
| CN | 105095722 A | 11/2015 |
| CN | 105184284 A | 12/2015 |
| CN | 105335707 A | 2/2016 |
| CN | 105469066 A | 4/2016 |

OTHER PUBLICATIONS

Extended European search report issued in corresponding European application No. 17778674.6 dated Mar. 22, 2019.
India Examination Report for IN Application No. 201837032205 dated Jan. 27, 2021. (8 pages).

* cited by examiner

METHOD FOR FINGERPRINT UNLOCKING AND TERMINAL

CROSS-REFERENCE TO RELATED APPLICATION(S)

This application is a continuation of international application No. PCT/CN2017/079612, filed on Apr. 6, 2017, which claims priority to Chinese Patent Application No. 201610218370.1, filed on Apr. 8, 2016, the contents of both of which are herein incorporated by reference in their entireties.

TECHNICAL FIELD

This disclosure relates to the technical field of terminal device, and particularly to a method for fingerprint unlocking and a terminal.

BACKGROUND

With rapid development of information technology, terminals (such as mobile phones, tablet computers, etc.) are more and more widely used. Fingerprint recognition technology serving as a standard configuration of the terminal has been widely applied to unlock the terminal, wakeup the terminal, mobile payment, and so on. Whilst the fingerprint recognition technology is popular, unlocking time of the terminal is an issue that is directly concerned by terminal manufacturers in order to achieve quick unlocking.

In actual use, when a finger of a user is over-dry or over-wet, the user has to press a fingerprint recognition module of the terminal for many times to make it possible for successful unlocking. Thus, the efficiency of fingerprint unlocking is disadvantageously affected.

SUMMARY

Implementations of the present disclosure provide a method for fingerprint unlocking and a terminal, which can improve the efficiency of fingerprint unlocking.

According to a first aspect of the implementations of the present disclosure, there is provided a method for fingerprint unlocking. The method includes the follows.

Multiple fingerprint images are obtained, by acquiring multiple sets of fingerprints through adjusting adjustment parameters of a fingerprint acquisition chip of a fingerprint recognition module more than once, in response to detecting that the fingerprint recognition module is pressed, where each fingerprint image corresponds to each set of fingerprints and the each set of fingerprints corresponds to adjustment parameters adjusted each time. A target fingerprint image with the best image quality is determined from the multiple fingerprint images. A terminal is unlocked when the target fingerprint image matches a preset fingerprint image successfully.

According to a second aspect of the implementations of the present disclosure, there is provided a terminal. The terminal includes at least one processor and a computer readable storage coupled to the at least one processor. The computer readable storage is configured to store at least one computer executable instruction thereon which, when executed by the at least one processor, cause the at least one processor to carry out all or part of the actions of any method according to the first aspect of the implementations of the present disclosure.

According to a third aspect of the implementations of the present disclosure, there is provided a non-transitory computer-readable storage medium storing a computer program which, when executed by a processor, causes the processor to carry out all or part of the actions of any method according to the first aspect of the implementations of the present disclosure.

BRIEF DESCRIPTION OF THE DRAWINGS

In order to illustrate technical solutions of implementations of the present disclosure more clearly, the drawings used in the implementations will be briefly described below. It will be apparent that the drawings described in the following are merely some implementations of the present disclosure, and it will be apparent to those skilled in the art that other drawings can be obtained from the drawings without any creative work.

DETAILED DESCRIPTION

Figure 1A:
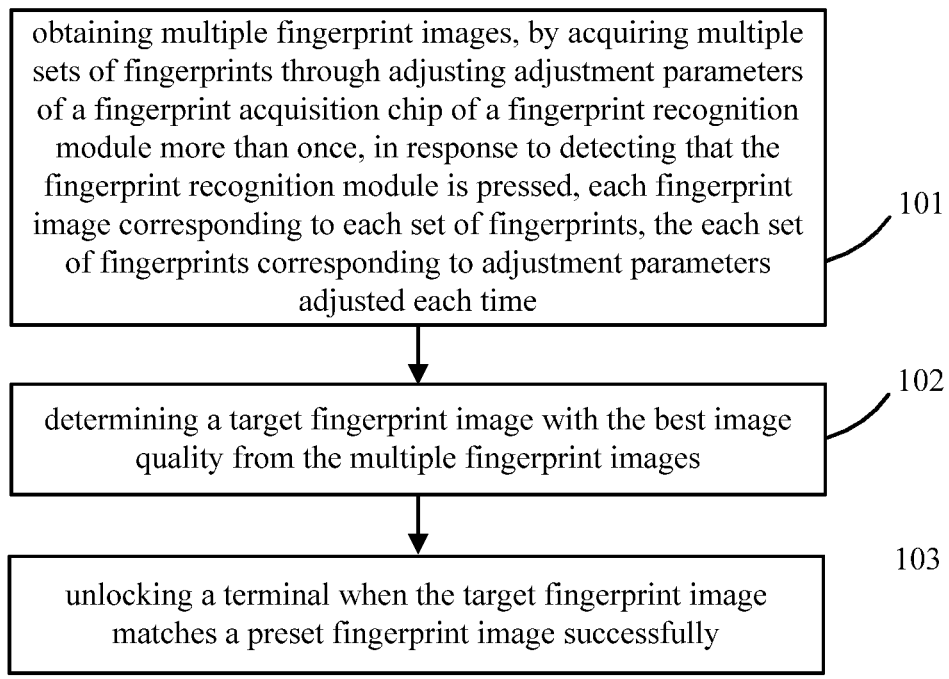
FIG. 1A is a schematic flow chart illustrating a method for fingerprint unlocking according to a first method implementation of the present disclosure.

Implementations of the present disclosure provide a method for fingerprint unlocking and a terminal, which can improve the efficiency of fingerprint unlocking.

Technical solutions of the present disclosure will be described clearly and completely with reference to the accompanying drawings; obviously, the implementations described below are merely part of rather than all of the implementations of the present disclosure. Based on the implementations of the present disclosure, other implementations obtained there from without any creative work by those of ordinary skill in the art shall fall into the protection scope of the present disclosure.

The terms "first", "second", "third", "fourth", and the like in the specification and claims of the present disclosure and the drawings are used to distinguish different objects rather than describe a specific order. In addition, terms of "including" and "having" and any inflexions thereof are intended to cover a non-exclusive inclusions relationship. For example, processes, methods, systems, products or devices containing a series of operations or units are not limitative to listed processes or units, other processes or units which are not listed can also be included, or other processes or units inherent to these processes, methods, products or devices can also be included.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

A terminal illustrated in the implementations of the present disclosure may include a smart phone (e.g., Android phone, iOS phone, Windows Phone, etc.), a tablet computer, a palmtop computer, a laptop computer, a mobile internet device (MID) or a wearable device. The foregoing terminal is only exemplary rather than exhaustive. The present disclosure includes but is not limited to the foregoing terminal.

A fingerprint recognition module in the implementations of the present disclosure may mainly include a coating, a sensor, and a fingerprint acquisition chip. The coating is configured to protect the sensor and the fingerprint acquisition chip. The sensor and the fingerprint acquisition chip are core components of the fingerprint recognition module, which are configured for fingerprint acquisition and recognition.

According to a first aspect of the implementations of the present disclosure, there is provided a method for fingerprint unlocking. The method includes: obtaining multiple fingerprint images, by acquiring multiple sets of fingerprints through adjusting adjustment parameters of a fingerprint acquisition chip of a fingerprint recognition module more than once, in response to detecting that the fingerprint recognition module is pressed, each fingerprint image corresponding to each set of fingerprints, the each set of fingerprints corresponding to adjustment parameters adjusted each time; determining a target fingerprint image with the best image quality from the plurality of fingerprint images; unlocking a terminal when the target fingerprint image matches a preset fingerprint image successfully.

According to a second aspect of the implementations of the present disclosure, there is provided a terminal. The terminal includes at least one processor and a computer readable storage. The computer readable storage is coupled to the at least one processor and stores at least one computer executable instruction thereon, which when executed by the at least one processor, cause the at least one processor to carry out actions, including: obtaining multiple fingerprint images, by acquiring fingerprints multiple sets of through adjusting adjustment parameters of a fingerprint acquisition chip of a fingerprint recognition module more than once, in response to detecting that the fingerprint recognition module is pressed, each fingerprint image corresponding to each set of fingerprints, the each set of fingerprints corresponding to adjustment parameters adjusted each time; determining a target fingerprint image with the best image quality from the plurality of fingerprint images; unlocking a terminal when the target fingerprint image matches a preset fingerprint image successfully.

According to a third aspect of the implementations of the present disclosure, there is provided a non-transitory computer-readable storage medium storing a computer program which, when executed by a processor, causes the processor to carry out actions: obtaining a plurality of fingerprint images, by acquiring a plurality of sets of fingerprints through adjusting adjustment parameters of a fingerprint acquisition chip of a fingerprint recognition module more than, in response to detecting that the fingerprint recognition module is pressed, each fingerprint image corresponding to each set of fingerprints, the each set of fingerprints corresponding to adjustment parameters adjusted each time; determining a target fingerprint image with the best image quality from the plurality of fingerprint images; unlocking a terminal when the target fingerprint image matches a preset fingerprint image successfully.

Referring to FIG. 1A, FIG. 1A is a schematic flow chart illustrating a method for fingerprint unlocking according to a first method implementation of the present disclosure. The method for fingerprint unlocking described in the implementation of the present disclosure starts with operations at block 101.

At block 101, multiple fingerprint images are obtained, by acquiring multiple sets of fingerprints through adjusting adjustment parameters of a fingerprint acquisition chip of a fingerprint recognition module more than once, in response to detecting that the fingerprint recognition module is pressed, where each fingerprint image corresponds to each set of fingerprints and the each set of fingerprints corresponds to adjustment parameters adjusted each time.

In the implementation of the present disclosure, when detecting that the fingerprint recognition module is pressed, the fingerprint recognition module can obtains the fingerprint images during the process of pressing the fingerprint recognition module by the user. By acquiring the fingerprints through adjusting the adjustment parameters of the fingerprint acquisition chip of the fingerprint recognition module, the multiple fingerprint images can be obtained with different adjustment parameters.

In an implementation, the adjustment parameters of the fingerprint acquisition chip of the fingerprint recognition module mainly include an analog-to-digital converter (ADC) offset and an ADC gain. The ADC offset is configured to indicate an offset of an ADC. For example, a fingerprint acquisition chip can collect 56*172 pixel points, with each pixel point corresponding to a pixel value in an image collection process of the fingerprint acquisition chip, thus, totally 10752 pixel values can be obtained. After the pixel values are normalized, that is, when the pixel values fall within a range from 0 to 1 (0~1), normally, most of the pixel values are distributed within a range from 0.4 to 0.8 (0.4~0.8). Since the pixel value of each pixel point is different, a pixel point distribution diagram may be formed. The ADC offset may have several grades, when the value of the ADC offset is higher, an overall pixel value corresponding to the pixel point distribution diagram is larger, and a fingerprint image will appear darker. The ADC gain is configured to indicate a gain of the ADC. When the gain is larger, the distribution diagram will be more dispersed. Similarly, when the gain is smaller, the distribution diagram will be more centralized. Further, when the distribution diagram is more dispersed, the image contrast will be higher, black pixel points in the fingerprint image will be darker, and white pixel points in the fingerprint image will be whiter. The adjustment parameters of the fingerprint acquisition chip in the fingerprint recognition module may further include a pixel gain, which is configured to indicate a gain of a pixel point. The pixel gain is determined by capacitors coupled to an amplifier in parallel. A number of capacitors are coupled to the amplifier in parallel, and each capacitor may be controlled by a switch. When the switch is turned on more frequently, the gain will be larger, the pixel value will be larger, and the signal strength will be higher. In actual use, in an ADC control process, the pixel gain is generally fixed, and the ADC offset and ADC gain are mainly adjusted. The ADC offset is configured to adjust the position of the whole distribution diagram, and the ADC gain is configured to adjust the concentration and dispersion of the distribution diagram. For example, when the user presses the fingerprint recognition module, image collection may be debugged by means of different adjustment parameters. For example, if the ADC offset and the ADC gain each has five levels, twenty-five combinations can be obtained, and at most twenty-five fingerprint images can be collected (acquired) each time.

Furthermore, the adjustment parameters at least include the ADC offset and the ADC gain. The ADC offset has M first adjustment levels, and the ADC gain has N second adjustment levels. M and N are integers greater than 1. Thus, when the terminal detects that the fingerprint recognition module is pressed, the multiple fingerprint images can be obtained by acquiring the fingerprints for several times with any first adjustment level selected from the M first adjustment levels and any second adjustment level selected from the N second adjustment levels. That is, when the terminal detects that the fingerprint recognition module is pressed, a fingerprint image can be obtained by acquiring the fingerprints with one first adjustment level selected from the M first adjustment levels and one second adjustment level selected from the N second adjustment levels. For example, when both M and N equal to 5, totally 25 fingerprint images can be obtained. In an implementation, three fingerprint images may be obtained. For example, three fingerprint images, namely a first fingerprint image, a second fingerprint image, and a third fingerprint image, are obtained by adjusting the ADC offset and the ADC gain. That is, the ADC offset is adjusted to the maximum level and the ADC gain is adjusted to the maximum level to obtain the first fingerprint image. The ADC offset is adjusted to the minimum level and the ADC gain is adjusted to the minimum level to obtain the second fingerprint image. The ADC offset is adjusted to the intermediate level and the ADC gain is adjusted to the intermediate level to obtain the third fingerprint image.

At block 102, a target fingerprint image with the best image quality is determined from the multiple fingerprint images.

In the implementation of the present disclosure, the terminal can determine the target fingerprint image with the best image quality from the multiple fingerprint images. The terminal can perform an image quality evaluation on each of the multiple fingerprint images according to one or more image quality evaluation indexes, to obtain multiple image quality evaluation values. The terminal selects a fingerprint image corresponding to a maximum image quality evaluation value as the target fingerprint image. The image quality evaluation indexes can include but not limit to image clarity, signal-to-noise ratio (SNR), ridge resolution, fingerprint image coverage rate, contrast ratio, average gray scale, and the like.

In one aspect, the terminal can perform an image quality evaluation on each of the multiple fingerprint images according to a same image quality evaluation index, to obtain a multiple image quality evaluation values. The terminal can select a fingerprint image corresponding to a maximum image quality evaluation value as the target fingerprint image.

In an implementation, the terminal can obtain clarity of each of the multiple fingerprint images and select a fingerprint image with the highest image clarity as the target fingerprint image.

In an implementation, the terminal can obtain SNR of each of the multiple fingerprint images and select a fingerprint image with the highest SNR as the target fingerprint image.

In an implementation, the terminal can obtain a fingerprint image coverage rate of each of the multiple fingerprint images and select a fingerprint image with the highest fingerprint image coverage rate as the target fingerprint image. As only part of the fingerprint image rather than entire fingerprint image may include fingerprint ridges. The fingerprint image coverage rate indicates a ratio of a fingerprint image with fingerprint ridges to the entire fingerprint image.

In an implementation, the terminal can obtain fingerprint image ridge resolution of each of the multiple fingerprint images and select a fingerprint image with the highest ridge resolution as the target fingerprint image.

In another aspect, the terminal can perform an image quality evaluation on each of the multiple fingerprint images according to at least two image quality evaluation indexes, to obtain multiple image quality evaluation values. The terminal selects a fingerprint image corresponding to a maximum image quality evaluation value as the target fingerprint image. That is, the target fingerprint image with the best image quality is determined from the multiple fingerprint images by using at least two image quality evaluation indexes configured to evaluate fingerprint images.

Specifically, an image quality evaluation value of each fingerprint image of the multiple fingerprint images can be calculated with a formula $$S = \sum_{i=1}^{K} \partial_i P_i.$$

A fingerprint image corresponding to a maximum image quality evaluation value is used as the target fingerprint image. S represents (indicates) the image quality evaluation value, K represents the number of the image quality evaluation indexes, $P_i$ represents a image quality evaluation value corresponding to the $i^{th}$ image quality evaluation index, $\partial_i$ represents a weight of the $i^{th}$ image quality evaluation index, and $$\sum_{i=1}^{K} \partial_i = 1.$$

K is an integer greater than 1.

At block 103, the terminal is unlocked when the target fingerprint image matches a preset fingerprint image successfully.

In the implementation of the present disclosure, when the target fingerprint image matches the preset fingerprint image successfully, unlock the terminal.

When the target fingerprint image is compared with the preset fingerprint image, a matching value between the target fingerprint image and the preset fingerprint image can be determined. When the matching value reaches a certain threshold, it can be determined that the target fingerprint image matches the preset fingerprint image successfully. On the other hand, when the matching value does not reach the certain threshold, it can be determined that the target fingerprint image does not match the preset fingerprint image. When the target fingerprint image is compared with the preset fingerprint image, fingerprint ridges of the target fingerprint image can be compared with the fingerprint ridges of the preset fingerprint image. When a matching value reaches a certain threshold, it can be determined that the fingerprint ridges of the target fingerprint image match the fingerprint ridges of the preset fingerprint image successfully. On the other hand, when the matching value does not reach the certain threshold, it can be determined that the fingerprint ridges of the target fingerprint image do not match the fingerprint ridges of the preset fingerprint image. When the target fingerprint image is compared with the preset fingerprint image, feature points such as Harris corners and scale-invariant feature transform (SIFT) corners of the target fingerprint image can be extracted. Feature points of the obtained target fingerprint image can be compared with feature points of the preset fingerprint image. When a matching value reaches a certain threshold, it can be determined that the feature points of the target fingerprint image are successfully matched with the feature points of the preset fingerprint image. When the matching value does not reach the certain threshold, it can be determined that the feature points of the target fingerprint image do not match the feature points of the preset fingerprint image.

By means of the implementations of the present disclosure, in response to detecting that a fingerprint recognition module is pressed, multiple fingerprint images are obtained, by acquiring fingerprints through adjusting adjustment parameters of a fingerprint acquisition chip of the fingerprint recognition module. Further, a target fingerprint image with the best image quality from the multiple fingerprint images is determined. Then, a terminal is unlocked when the target fingerprint image matches a preset fingerprint image successfully. Therefore, the target fingerprint image with the best image quality can be obtained by adjusting the adjustment parameters. When the target fingerprint image is compared with the preset fingerprint image, the matching success rate between the two can be improved, that is, the efficiency of fingerprint unlocking can be improved. In particular, when the fingerprints of the user's finger are fingerprints of a dry finger or fingerprints of a wet finger, the number of times that the user presses the fingerprint recognition module can be reduced, and thus, the efficiency of fingerprint unlocking is improved, and time consumed by fingerprint unlocking is reduced.

Figure 1B:
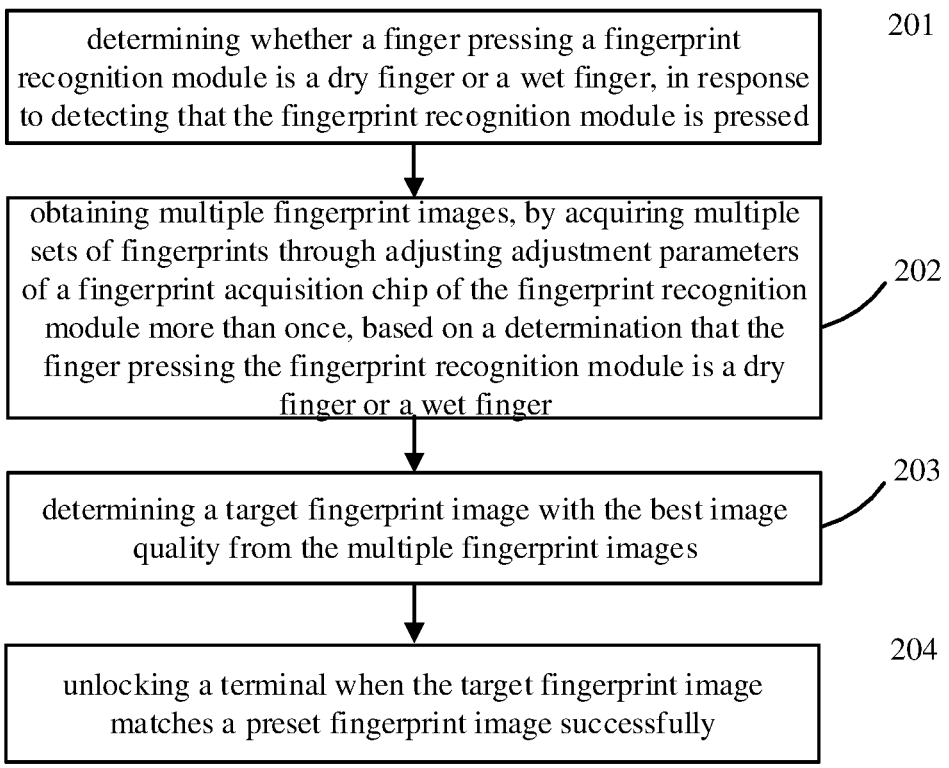
FIG. 1B is a schematic flow chart illustrating a method for fingerprint unlocking according to a second method implementation of the present disclosure.

Referring to FIG. 1B, FIG. 1B is a schematic flow chart illustrating a method for fingerprint unlocking according to a second implementation of the present disclosure. The method for fingerprint unlocking described in the implementation of the present disclosure starts with operations at block 201.

At block 201, in response to detecting that a fingerprint recognition module is pressed, whether a finger pressing the fingerprint recognition module is a dry finger or a wet finger is determined.

Figure 2A:
FIG. 2A shows an example of fingerprint ridges of a dry finger.
Figure 2B:
FIG. 2B shows an example of fingerprint ridges of a wet finger.
Figure 2C:
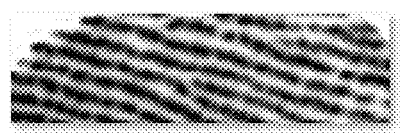
FIG. 2C shows an example of fingerprint ridges of a normal finger.

In the implementation of the present disclosure, when a terminal detects that the fingerprint recognition module is pressed, the terminal can determine whether fingerprints of the finger pressing the fingerprint recognition module belong to (come from) a dry finger or a wet finger. Referring to FIG. 2A to FIG. 2C, FIG. 2A shows an example of fingerprint ridges of a dry finger, FIG. 2B shows an example of fingerprint ridges of a wet finger, and FIG. 2C shows an example of fingerprint ridges of a normal finger. With an understanding that fingerprint ridges in a fingerprint image of a dry finger are intermittent and large-scale fingerprint ridges in a fingerprint image of a wet finger are blurred and almost indistinguishable, the fingerprint image can be analyzed to determine whether the fingerprint image is from a dry finger or a wet finger.

In an implementation, the terminal can extract ridge features of the fingerprint(s) of the finger pressing the fingerprint recognition module to determine whether the fingerprints are from a dry finger or a wet finger. When the ridges in a fingerprint image are discontinuous, the fingerprint image is a fingerprint image of a dry finger. On the contrary, when large-scale fingerprint ridges in a fingerprint image are fuzzy, the fingerprint image is a fingerprint image of a wet finger.

In an implementation, the terminal can extract the number of feature points of the fingerprint(s) of the finger pressing the fingerprint recognition module and determine whether the number of the feature points falls within a preset range. The maximum value of the preset range may be smaller than a first threshold. For example, the first threshold may be a certain percentage (for example, 50%) of the number of the feature points of the preset fingerprint image, or the first threshold is a default value set by the system. Furthermore, values of the preset range may fall between a second threshold and a third threshold, and the second threshold is smaller than the third threshold. The third threshold may be a certain percentage (for example, 50%) of the number of the feature points of the first fingerprint image, or the third threshold is a default value set by the system. The second threshold may be a certain percentage (for example, 30%) of the number of the feature points of the preset fingerprint image, or the second threshold is a certain system default value. In a normal situation, the number of feature points of a dry finger or a wet finger is smaller, and the terminal can extract the number of feature points of the fingerprint. For example, when the number of feature points is less than the first threshold, it can be determined that the fingerprint is from a dry finger or a wet finger.

Furthermore, when detecting that the fingerprint recognition module is pressed and the finger pressing the fingerprint recognition module is not a dry finger or a wet finger, the terminal can obtain fingerprint images by acquiring fingerprints through a default adjustment parameter, match the fingerprint image with the preset fingerprint image, and unlock the terminal when the match is successful.

At block 202, multiple fingerprint images are obtained, by acquiring multiple sets of fingerprints through adjusting adjustment parameters of a fingerprint acquisition chip of the fingerprint recognition module more than once, based on a determination that the finger pressing the fingerprint recognition module is a dry finger or a wet finger, where each fingerprint image corresponds to each set of fingerprints and the each set of fingerprints corresponds to adjustment parameters adjusted each time.

At block 203, a target fingerprint image with the best image quality is determined from the multiple fingerprint images.

At block 204, the terminal is unlocked when the target fingerprint image matches a preset fingerprint image successfully.

For details of operations at block 202 to 204 described in FIG. 1B, reference can be made to descriptions of operations at block 101 to 103 described in FIG. 1A, and will not be repeated here again.

By means of the implementations of the present disclosure, in response to detecting that a fingerprint recognition module is pressed, multiple fingerprint images are obtained, by acquiring fingerprints through adjusting adjustment parameters of a fingerprint acquisition chip of the fingerprint recognition module. Further, a target fingerprint image with the best image quality from the multiple fingerprint images is determined. Then, a terminal is unlocked when the target fingerprint image matches a preset fingerprint image successfully. Therefore, the target fingerprint image with the best image quality can be obtained by adjusting the adjustment parameters. When the target fingerprint image is compared with the preset fingerprint image, the matching success rate between the two can be improved, that is, the efficiency of fingerprint unlocking can be improved. In particular, when the fingerprints of the user's finger are fingerprints of a dry finger or fingerprints of a wet finger, the number of times that the user presses the fingerprint recognition module can be reduced, and thus, the efficiency of fingerprint unlocking is improved, and time consumed by fingerprint unlocking is reduced.

Figure 3:
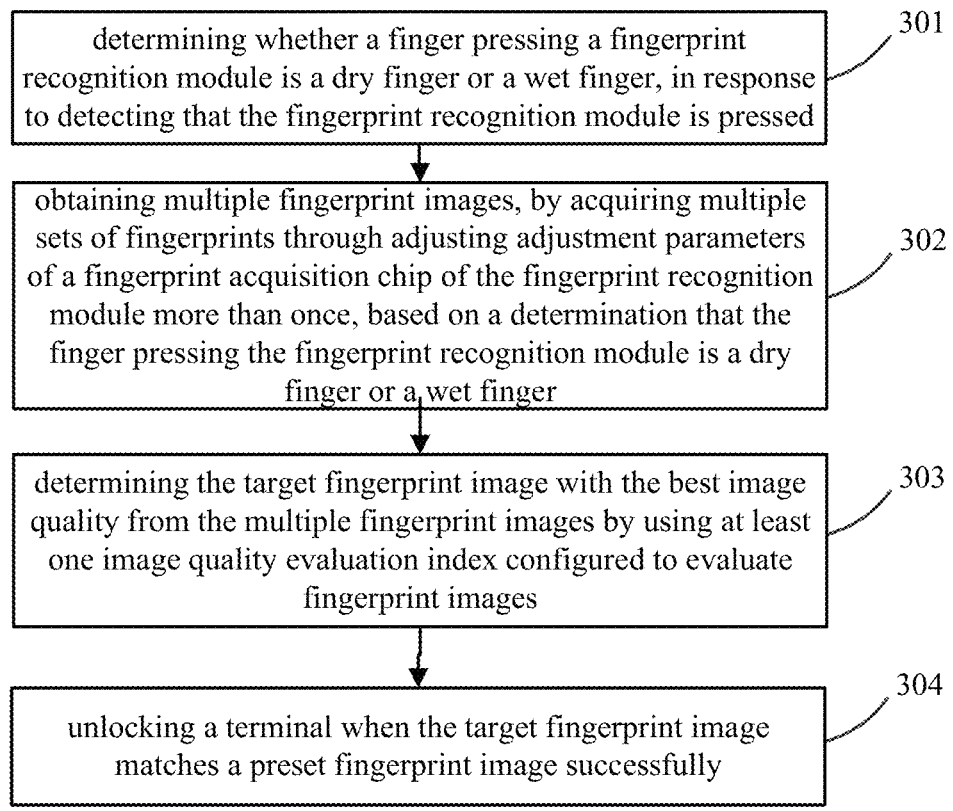
FIG. 3 is a schematic flow chart illustrating a method for fingerprint unlocking according to a third method implementation of the present disclosure.

Referring to FIG. 3, FIG. 3 is a schematic flow chart illustrating a method for fingerprint unlocking according to a third implementation of the present disclosure. The method for fingerprint unlocking described in the implementation of the present disclosure starts with operations at block 301.

At block 301, in response to detecting that a fingerprint recognition module is pressed, whether a finger pressing the fingerprint recognition module is a dry finger or a wet finger is determined.

At block 302, multiple fingerprint images are obtained, by acquiring multiple sets of fingerprints through adjusting adjustment parameters of a fingerprint acquisition chip of the fingerprint recognition module more than once, based on a determination that the finger pressing the fingerprint recognition module is a dry finger or a wet finger, where each fingerprint image corresponds to each set of fingerprints and the each set of fingerprints corresponds to adjustment parameters adjusted each time.

At block 303, a target fingerprint image with the best image quality is determined from the multiple fingerprint images by using at least one image quality evaluation index configured to evaluate fingerprint images.

At block 304, the terminal is unlocked when the target fingerprint image matches a preset fingerprint image successfully.

For details of operations at block 301 described in FIG. 3, reference can be made to descriptions of operations at block 201 described in FIG. 1B. For details of operations at block 302 to 304 described in FIG. 3, reference can be made to descriptions of operations at block 101 to 103 described in FIG. 1A, and will not be repeated here again.

By means of the implementations of the present disclosure, in response to detecting that a fingerprint recognition module is pressed, multiple fingerprint images are obtained, by acquiring fingerprints through adjusting adjustment parameters of a fingerprint acquisition chip of the fingerprint recognition module. Further, a target fingerprint image with the best image quality from the multiple fingerprint images is determined. Then, a terminal is unlocked when the target fingerprint image matches a preset fingerprint image successfully. Therefore, the target fingerprint image with the best image quality can be obtained by adjusting the adjustment parameters. When the target fingerprint image is compared with the preset fingerprint image, the matching success rate between the two can be improved, that is, the efficiency of fingerprint unlocking can be improved. In particular, when the fingerprints of the user's finger are fingerprints of a dry finger or fingerprints of a wet finger, the number of times that the user presses the fingerprint recognition module can be reduced, and thus, the efficiency of fingerprint unlocking is improved, and time consumed by fingerprint unlocking is reduced.

Figure 4A:
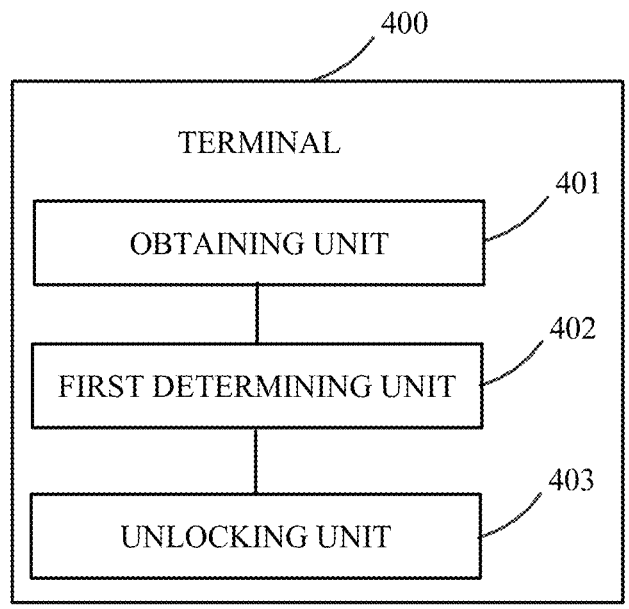
FIG. 4A is a schematic structural diagram illustrating a terminal according to a first terminal implementation of the present disclosure.

Referring to FIG. 4A, FIG. 4A is a schematic structural diagram illustrating a terminal according to a first implementation of the present disclosure. The terminal 400 described in the implementation includes an obtaining unit 401, a first determining unit 402, and an unlocking unit 403.

The obtaining unit 401 is configured to obtain multiple fingerprint images, by acquiring multiple sets of fingerprints through adjusting adjustment parameters of a fingerprint acquisition chip of a fingerprint recognition module more than once, in response to detecting that the fingerprint recognition module is pressed, where each fingerprint image corresponds to each set of fingerprints and the each set of fingerprints corresponds to adjustment parameters adjusted each time.

The first determining unit 402 is configured to determine a target fingerprint image with the best image quality from the multiple fingerprint images obtained by the obtaining unit 401.

The unlocking unit 403 is configured to unlock a terminal when the target fingerprint image determined by the first determining unit 402 matches a preset fingerprint image successfully.

In an implementation, the adjustment parameters at least include an analog-to-digital converter (ADC) offset and an ADC gain. The ADC offset includes M first adjustment levels, the ADC gain includes N second adjustment levels, and M and N are integers greater than 1.

The obtaining unit 401 configured to obtain the multiple fingerprint images, by acquiring the multiple sets of fingerprints through adjusting the adjustment parameters of the fingerprint acquisition chip of the fingerprint recognition module more than once is further configured to obtain the multiple fingerprint images, by acquiring the fingerprints for several times with any first adjustment level selected from the M first adjustment levels and any second adjustment level selected from the N second adjustment levels.

In an implementation, the first determining unit 402 configured to determine the target fingerprint image with the best image quality from the multiple fingerprint images obtained by the obtaining unit 401 is further configured to determine the target fingerprint image with the best image quality from the multiple fingerprint images by using at least one image quality evaluation index configured to evaluate fingerprint images.

In an implementation, the first determining unit 402 configured to determine the target fingerprint image with the best image quality from the multiple fingerprint images obtained by the obtaining unit 401 is further configured to calculate an image quality evaluation value of each fingerprint image of the multiple fingerprint images with a formula $$S = \sum_{i=1}^{K} \partial_i P_i,$$

and use a fingerprint image corresponding to a maximum image quality evaluation value as the target fingerprint image.

S represents the image quality evaluation value, K represents the number of the image quality evaluation indexes, $P_i$ represents a image quality evaluation value corresponding to the $i^{th}$ image quality evaluation index, $\partial_i$ represents a weight of the $i^{th}$ image quality evaluation index, and $$\sum_{i=1}^{K} \partial_i = 1.$$

Figure 4B:
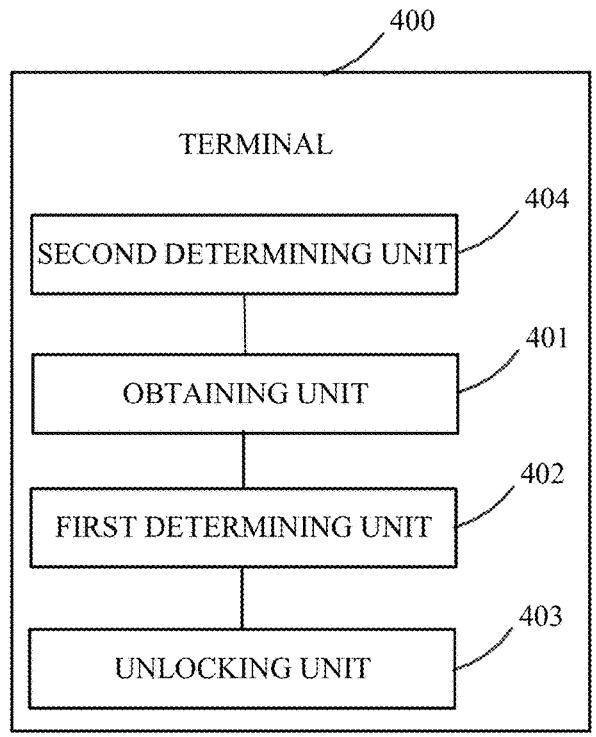
FIG. 4B is another schematic structural diagram illustrating a terminal according to the first terminal implementation of the present disclosure.

In another implementation, as illustrated in FIG. 4B, the terminal described in FIG. 4B can further include a second determining unit 404.

The second determining unit 404 is configured to determine whether a finger pressing the fingerprint recognition module is a dry finger or a wet finger, in response to detecting that the fingerprint recognition module is pressed.

The obtaining unit 401 is further configured to obtain the multiple fingerprint images, by acquiring the multiple sets of fingerprints through adjusting adjustment parameters of the fingerprint acquisition chip of the fingerprint recognition module more than once, based on a determination of the second determining unit 404 is that the finger pressing the fingerprint recognition module is a dry finger or a wet finger.

In an implementation, the second determining unit 404 is further configured to extract ridge features of a fingerprint(s) of the finger pressing the fingerprint recognition module and determine whether the fingerprint belongs to a dry finger or a wet finger.

In an implementation, the second determining unit 404 is further configured to determine the number of feature points of the fingerprint(s) of the finger pressing the fingerprint recognition module and judge whether the number of feature points is in a preset range.

The above units can be realized through one or more processors, for example, the above units can be integrated in one processor, or, can be distributed among different processors.

By means of the terminal in the implementations of the present disclosure, in response to detecting that a fingerprint recognition module is pressed, multiple fingerprint images are obtained, by acquiring fingerprints through adjusting adjustment parameters of a fingerprint acquisition chip of the fingerprint recognition module. Further, a target fingerprint image with the best image quality from the multiple fingerprint images is determined. Then, a terminal is unlocked when the target fingerprint image matches a preset fingerprint image successfully. Therefore, the target fingerprint image with the best image quality can be obtained by adjusting the adjustment parameters. When the target fingerprint image is compared with the preset fingerprint image, the matching success rate between the two can be improved, that is, the efficiency of fingerprint unlocking can be improved. In particular, when the fingerprints of the user's finger are fingerprints of a dry finger or fingerprints of a wet finger, the number of times that the user presses the fingerprint recognition module can be reduced, as such, the efficiency of fingerprint unlocking is improved, and time consumed by fingerprint unlocking is reduced.

Figure 5:
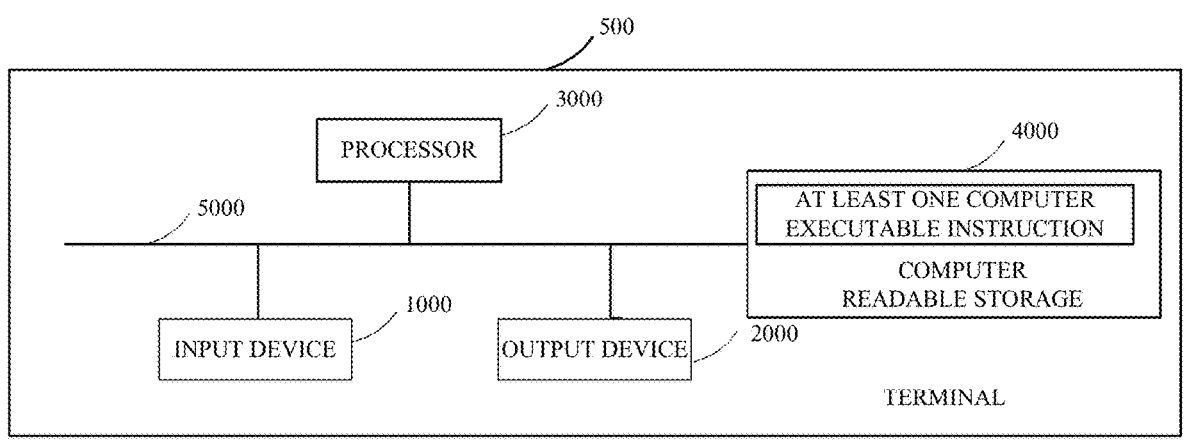
FIG. 5 is a schematic structural diagram illustrating a terminal according to a second terminal implementation of the present disclosure.

FIG. 5 is a schematic structure diagram of a terminal according to a second implementation of the present disclosure. The terminal 500 may include at least one input device 1000, at least one output device 2000, at least one processor 3000 (such as a central processing unit (CPU)), and a computer readable storage 4000. The input device 1000, the output device 2000, the processor 3000, and the computer readable storage 4000 are coupled with each other via a bus 5000.

The input device 1000 may be a touch panel, a physical key, a mouse, a fingerprint recognition module, etc.

The output device 2000 may be a display screen.

The computer readable storage 4000 may be a high-speed random access memory (RAM), or may be a non-volatile memory such as a disk memory. The computer readable storage 4000 is configured to store a set of program codes. The input device 1000, the output device 2000, the processor 3000 are configured to call the program codes stored in the computer readable storage 4000 to execute the following operations: obtaining multiple fingerprint images, by acquiring multiple sets of fingerprints through adjusting adjustment parameters of a fingerprint acquisition chip of a fingerprint recognition module more than once, in response to detecting that the fingerprint recognition module is pressed, determining a target fingerprint image with the best image quality from the multiple fingerprint images, and unlocking a terminal when the target fingerprint image matches a preset fingerprint image successfully. Each fingerprint image corresponds to each set of fingerprints and the each set of fingerprints corresponds to adjustment parameters adjusted each time.

In an implementation, the adjustment parameters at least include an analog-to-digital converter (ADC) offset and an ADC gain, the ADC offset includes M first adjustment levels, the ADC gain includes N second adjustment levels, and M and N are integers greater than 1.

The processor 3000, configured to evoke the program codes stored in the memory to carry out the action of obtaining the multiple fingerprint images, by acquiring multiple sets of the fingerprints through adjusting the adjustment parameters of the fingerprint acquisition chip of the fingerprint recognition module more than once, is further configured to evoke the executable program codes stored in the memory to carry out actions: obtaining the multiple fingerprint images, by acquiring the fingerprints for several times with any first adjustment level selected from the M first adjustment levels and any second adjustment level selected from the N second adjustment levels.

In an implementation, the processor 3000, configured to evoke the executable program codes stored in the memory to carry out the action of determining the target fingerprint image with the best image quality from the multiple fingerprint images, is further configured to evoke the executable program codes stored in the memory to carry out actions: determining the target fingerprint image with the best image quality from the multiple fingerprint images by using at least one image quality evaluation index configured to evaluate fingerprint images.

In an implementation, the processor 3000, configured to evoke the executable program codes stored in the memory to carry out the action of determining the target fingerprint image with the best image quality from the multiple fingerprint images by using at least one image quality evaluation index configured to evaluate fingerprint images, is further configured to evoke the executable program codes stored in the memory to carry out actions: calculating an image quality evaluation value of each fingerprint image of the multiple fingerprint images with a formula $$S = \sum_{i=1}^{K} \partial_i P_i,$$

and using a fingerprint image corresponding to a maximum image quality evaluation value as the target fingerprint image.

S represents the image quality evaluation value, K represents the number of the image quality evaluation indexes, $P_i$ represents a image quality evaluation value corresponding to the $i^{th}$ image quality evaluation index, $\partial_i$ represents a weight of the $i^{th}$ image quality evaluation index, and $$\sum_{i=1}^{K} \partial_i = 1.$$

In an implementation, the processor 3000, is further configured to evoke the executable program codes stored in the memory to carry out actions in response to detecting that the fingerprint recognition module is pressed: determining whether a finger pressing the fingerprint recognition module is a dry finger or a wet finger and proceeding to the obtaining multiple fingerprint images, by acquiring multiple sets of fingerprints through adjusting adjustment parameters of a fingerprint acquisition chip of a fingerprint recognition module more than once, based on a determination that the finger pressing the fingerprint recognition module is a dry finger or a wet finger.

In an implementation, the processor 3000, configured to evoke the executable program codes stored in the memory to carry out the action of determining whether the finger pressing the fingerprint recognition module is a dry finger or a wet finger, is further configured to evoke the executable program codes stored in the memory to carry out one of the following actions: extracting ridge features of a fingerprint(s) of the finger pressing the fingerprint recognition module and determining whether the fingerprint belongs to a dry finger or a wet finger; and determining the number of feature points of the fingerprint(s) of the finger pressing the fingerprint recognition module and judging whether the number of feature points is in a preset range.

In a specific implementation, the input device 1000, the output device 2000, and the processor 3000 can be configured to implement implementations described in the first, second and third implementation of the method for fingerprint unlocking of the implementations of the present disclosure. The input device 1000, the output device 2000, and the processor 3000 can also be configured to implement implementations described in the first, second and third implementation of the terminal of the implementations of the present disclosure, which will not be described in detail herein.

The implementations of the present disclosure also provide a a non-transitory computer-readable storage medium. The non-transitory computer-readable storage medium stores computer programs which, when executed, by a processor, causes the processor to carry out all or part of the actions of any method for fingerprint unlocking described in the above-described method implementations.

In the foregoing implementations, the description of each implementation has its own emphasis. For the parts not described in detail in one implementation, reference may be made to related descriptions in other implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for fingerprint unlocking, comprising:
determining whether a finger pressing a fingerprint recognition module is a dry finger or a wet finger;
based on a determination that the finger pressing the fingerprint recognition module is not a dry finger or a wet finger, obtaining a fingerprint image by acquiring fingerprints through a default adjustment parameter, matching the fingerprint image with the preset fingerprint image, and unlocking the terminal when the match is successful;
based on a determination that the finger pressing the fingerprint recognition module is a dry finger or a wet finger, obtaining a plurality of fingerprint images, by acquiring a plurality of sets of fingerprints through adjusting adjustment parameters of a fingerprint acquisition chip of the fingerprint recognition module more than once, in response to detecting that the fingerprint recognition module is pressed, each fingerprint image corresponding to each set of fingerprints, the each set of fingerprints corresponding to adjustment parameters adjusted each time;
determining a target fingerprint image with the best image quality from the plurality of fingerprint images; and
unlocking a terminal when the target fingerprint image matches a preset fingerprint image successfully.

2. The method of claim 1, wherein the adjustment parameters comprise an analog-to-digital converter (ADC) offset and an ADC gain, the ADC offset comprises M first adjustment levels, the ADC gain comprises N second adjustment levels, and M and N are integers greater than 1; and
wherein obtaining the plurality of fingerprint images, by acquiring the plurality of sets of fingerprints through adjusting the adjustment parameters of the fingerprint acquisition chip of the fingerprint recognition module more than once comprises:
obtaining the plurality of fingerprint images, by acquiring the fingerprints for several times with any first adjustment level selected from the M first adjustment levels and any second adjustment level selected from the N second adjustment levels.

3. The method of claim 1, wherein the target fingerprint image is one selected from a group consisting of: a fingerprint image with the highest clarity of the plurality of fingerprint images, a fingerprint image with the highest signal-to-noise ratio (SNR) of the plurality of fingerprint images, a fingerprint image with the highest coverage rate of the plurality of fingerprint images, and a fingerprint image with the highest ridge resolution of the plurality of fingerprint images.

4. The method of claim 1, wherein determining the target fingerprint image with the best image quality from the plurality of fingerprint images comprises:
determining the target fingerprint image with the best image quality from the plurality of fingerprint images by using at least one image quality evaluation index configured to evaluate fingerprint images.

5. The method of claim 4, wherein determining the target fingerprint image with the best image quality from the plurality of fingerprint images by using the at least one image quality evaluation index configured to evaluate the fingerprint images comprises:
calculating an image quality evaluation value of each fingerprint image of the plurality of fingerprint images with a formula $$S = \sum_{i=1}^{K} \partial_i P_i;$$

and
using a fingerprint image corresponding to a maximum image quality evaluation value as the target fingerprint image, wherein
S represents the image quality evaluation value, K represents the number of the image quality evaluation indexes, $P_i$ represents an image quality evaluation value corresponding to the $i^{th}$ image quality evaluation index, $\partial_i$ represents a weight of the $i^{th}$ image quality evaluation index, and $$\sum_{i=1}^{K} \partial_i = 1.$$

6. The method of claim 1, wherein determining whether the finger pressing the fingerprint recognition module is the dry finger or the wet finger comprises one of:
extracting ridge features of a fingerprint of the finger pressing the fingerprint recognition module and determining whether the fingerprint belongs to the dry finger or the wet finger; and
determining the number of feature points of the fingerprint of the finger pressing the fingerprint recognition module and determining whether the number of feature points is in a preset range.

7. A terminal, comprising:
at least one processor; and
a computer readable storage, coupled to the at least one processor and storing at least one computer executable instruction thereon, which when executed by the at least one processor, cause the at least one processor to:
determine whether a finger pressing a fingerprint recognition module is a dry finger or a wet finger;
based on a determination that the finger pressing the fingerprint recognition module is not a dry finger or a wet finger, obtain a fingerprint image by acquiring fingerprints through a default adjustment parameter, match the fingerprint image with the preset fingerprint image, and unlock the terminal when the match is successful;
based on a determination that the finger pressing the fingerprint recognition module is a dry finger or a wet finger, obtain a plurality of fingerprint images, by acquiring fingerprints a plurality of sets of through adjusting adjustment parameters of a fingerprint acquisition chip of the fingerprint recognition module more than once, in response to detecting that the fingerprint recognition module is pressed, each fingerprint image corresponding to each set of fingerprints, the each set of fingerprints corresponding to adjustment parameters adjusted each time;
determine a target fingerprint image with the best image quality from the plurality of fingerprint images; and
unlock a terminal when the target fingerprint image matches a preset fingerprint image successfully.

8. The terminal of claim 7, wherein the adjustment parameters comprise an analog-to-digital converter (ADC) offset and an ADC gain, the ADC offset comprises M first adjustment levels, the ADC gain comprises N second adjustment levels, and M and N are integers greater than 1; and
wherein the at least one processor caused to obtain the plurality of fingerprint images, by acquiring the plurality of sets of fingerprints through adjusting the adjustment parameters of the fingerprint acquisition chip of the fingerprint recognition module more than once is further caused to:
obtain the plurality of fingerprint images, by acquiring the fingerprints for several times with any first adjustment level selected from the M first adjustment levels and any second adjustment level selected from the N second adjustment levels.

9. The terminal of claim 7, wherein the target fingerprint image is one selected from a group consisting of: a fingerprint image with the highest clarity of the plurality of fingerprint images, a fingerprint image with the highest signal-to-noise ratio (SNR) of the plurality of fingerprint images, a fingerprint image with the highest coverage rate of the plurality of fingerprint images, and a fingerprint image with the highest ridge resolution of the plurality of fingerprint images.

10. The terminal of claim 7, wherein the at least one processor caused to determine the target fingerprint image with the best image quality from the plurality of fingerprint images is further caused to:
determine the target fingerprint image with the best image quality from the plurality of fingerprint images by using at least one image quality evaluation index configured to evaluate fingerprint images.

11. The terminal of claim 10, wherein the at least one processor caused to determine the target fingerprint image with the best image quality from the plurality of fingerprint images by using the at least one image quality evaluation index configured to evaluate the fingerprint images is further caused to:
calculate an image quality evaluation value of each fingerprint image of the plurality of fingerprint images with a formula $$S = \sum_{i=1}^{K} \partial_i P_i;$$

and
use a fingerprint image corresponding to a maximum image quality evaluation value as the target fingerprint image; wherein
S represents the image quality evaluation value, K represents the number of the image quality evaluation indexes, $P_i$ represents an image quality evaluation value corresponding to the $i^{th}$ image quality evaluation index, $\partial_i$ represents a weight of the $i^{th}$ image quality evaluation index, and $$\sum_{i=1}^{K} \partial_i = 1.$$

12. The terminal of claim 7, wherein the at least one processor caused to determine whether the finger pressing the fingerprint recognition module is the dry finger or the wet finger is further caused to:
extract ridge features of a fingerprint of the finger pressing the fingerprint recognition module and determine whether the fingerprint belongs to the dry finger or the wet finger; and
determine the number of feature points of the fingerprint of the finger pressing the fingerprint recognition module and determine whether the number of feature points is in a preset range.

13. A non-transitory computer-readable storage medium storing a computer program which, when executed by a processor, causes the processor to:
determine whether a finger pressing a fingerprint recognition module is a dry finger or a wet finger;
based on a determination that the finger pressing the fingerprint recognition module is not a dry finger or a wet finger, obtain a fingerprint image by acquiring fingerprints through a default adjustment parameter, match the fingerprint image with the preset fingerprint image, and unlock the terminal when the match is successful;
based on a determination that the finger pressing the fingerprint recognition module is a dry finger or a wet finger, obtain a plurality of fingerprint images, by acquiring a plurality of sets of fingerprints through adjusting adjustment parameters of a fingerprint acquisition chip of the fingerprint recognition module more than, in response to detecting that the fingerprint recognition module is pressed, each fingerprint image corresponding to each set of fingerprints, the each set of fingerprints corresponding to adjustment parameters adjusted each time;
determine a target fingerprint image with the best image quality from the plurality of fingerprint images; and
unlock a terminal when the target fingerprint image matches a preset fingerprint image successfully.

14. The non-transitory computer-readable storage medium of claim 13, wherein the adjustment parameters comprise an analog-to-digital converter (ADC) offset and an ADC gain, the ADC offset comprises M first adjustment levels, the ADC gain comprises N second adjustment levels, and M and N are integers greater than 1; and
wherein the computer program executed by the processor to obtain the plurality of fingerprint images, by acquiring the plurality of sets of fingerprints through adjusting the adjustment parameters of the fingerprint acquisition chip of the fingerprint recognition module more than once is executed by the processor to carry out actions, comprising:
obtain the plurality of fingerprint images, by acquiring the fingerprints for several times with any first adjustment level selected from the M first adjustment levels and any second adjustment level selected from the N second adjustment levels.

15. The non-transitory computer-readable storage medium of claim 13, wherein the computer program executed by the processor to determine the target fingerprint image with the best image quality from the plurality of fingerprint images is further executed by the processor to:
determine the target fingerprint image with the best image quality from the plurality of fingerprint images by using at least one image quality evaluation index configured to evaluate fingerprint images.

16. The non-transitory computer-readable storage medium of claim 13, wherein the computer program executed by the processor to determine the target fingerprint image with the best image quality from the plurality of fingerprint images by using at least one image quality evaluation index configured to evaluate the fingerprint images is further executed by the processor to:
　　calculate an image quality evaluation value of each fingerprint image of the plurality of fingerprint images with a formula $$S = \sum_{i=1}^{K} \partial_i P_i;$$

and
　　use a fingerprint image corresponding to a maximum image quality evaluation value as the target fingerprint image; wherein
S represents the image quality evaluation value, K represents the number of the image quality evaluation indexes, $P_i$ represents an image quality evaluation value corresponding to the $i^{th}$ image quality evaluation index, $\partial^i$ represents a weight of the $i^{th}$ image quality evaluation index, and $$\sum_{i=1}^{K} \partial_i = 1.$$

17. The non-transitory computer-readable storage medium of claim 13, wherein the computer program executed by the processor to determine whether the finger pressing the fingerprint recognition module is the dry finger or the wet finger is executed by the processor to perform one of:
　　extracting ridge features of a fingerprint of the finger pressing the fingerprint recognition module and determining whether the fingerprint belongs to the dry finger or the wet finger; and
　　determining the number of feature points of the fingerprint of the finger pressing the fingerprint recognition module and determining whether the number of feature points is in a preset range.

\* \* \* \* \*